United States Patent [19]

Kato et al.

[11] Patent Number: 4,721,640
[45] Date of Patent: * Jan. 26, 1988

[54] FLEXIBLE MAGNETIC DISK SHEET

[75] Inventors: Mikihiko Kato; Shigeo Komine; Kazuhiko Morita, all of Kanagawa, Japan

[73] Assignee: Fuji Photo Film Co., Ltd., Kanagawa, Japan

[*] Notice: The portion of the term of this patent subsequent to Apr. 8, 2003 has been disclaimed.

[21] Appl. No.: 673,640

[22] Filed: Nov. 21, 1984

[30] Foreign Application Priority Data

Nov. 21, 1983 [JP] Japan .................. 58-219107

[51] Int. Cl.4 .................................. G11B 5/72
[52] U.S. Cl. ........................... 428/65; 427/44;
427/54.1; 427/128; 427/131; 428/64; 428/137;
428/195; 428/336; 428/425.9; 428/522;
428/694; 428/695; 428/900; 428/323; 428/327;
428/331
[58] Field of Search .......... 360/133, 99, 134–136;
428/65, 64, 336, 137, 195, 425.9, 480, 694, 695,
900, 522, 323, 327, 331; 427/44, 54.1, 128, 131

[56] References Cited

U.S. PATENT DOCUMENTS

| 3,466,156 | 9/1969 | Peters | 427/132 |
|---|---|---|---|
| 3,681,225 | 8/1972 | Genma | 427/132 |
| 4,239,828 | 12/1980 | Knope | 427/131 |
| 4,335,183 | 6/1982 | Hosaka | 428/900 |
| 4,368,239 | 1/1983 | Nakajima | 428/900 |
| 4,387,114 | 6/1983 | Conner | 427/284 |
| 4,404,247 | 9/1983 | Dominguez-Burguette | 428/900 |
| 4,434,210 | 2/1984 | Nakajima | 427/44 |
| 4,486,500 | 12/1984 | Naruo | 428/900 |
| 4,523,246 | 6/1985 | Okuzawa | 360/133 |
| 4,539,220 | 9/1985 | Martinelli | 427/128 |
| 4,578,299 | 3/1986 | Kato | 428/900 |
| 4,581,270 | 4/1986 | Kato | 428/694 |

Primary Examiner—Ellis P. Robinson
Attorney, Agent, or Firm—Sughrue, Mion, Zinn, Macpeak & Seas

[57] ABSTRACT

A flexible magnetic disk sheet including a central circular hole is described, having a protective layer on a surface portion surrounding the edge of the central circular hole, comprising the protective layer prepared by coating (a) a compound having an acrylate bond or a methacrylate bond at the end of at least one of a main chain and a side chain of molecules thereof, and (b) a solid lubricating agent, and exposing to radiation thereon for polymerizing and hardening it.

12 Claims, 7 Drawing Figures

FLEXIBLE MAGNETIC DISK SHEET

FIELD OF THE INVENTION

The present invention relates to an improvement for flexible magnetic disks. More particularly, it relates to a flexible magnetic disk which can be loaded on writing and/or reading apparatus without eccentricity.

BACKGROUND OF THE INVENTION

Magnetic recording and playing of a magnetic signal in a flexible magnetic disk comprising a sheet in a jacket, involving connecting a sheet-position determining part of a writing and/or reading apparatus to a central circular hole of the jacket and sheet, and rotating the sheet, is known. For the sheet to be stored in the jacket, a space is provided in the magnetic disk which is slightly larger than the sheet, and thus the sheet sometimes moves to an eccentric position in the jacket during use or storage, with the result that the central circular hole of the sheet deviates from the position of a position-determining part (collet) of the apparatus when the disk is loaded on the apparatus, and the sheet may be supported at an eccentric position at the position determining time.

FIG. 1A and FIG. 1B illustrate this type of flexible magnetic sheet, located in a rectangular jacket having circular open part 1a, with circular flexible magnetic sheet 2 having central circular hole 2a thereof exposed in the afore-mentioned central circular open part 1a, said sheet being stored in the jacket to allow free rotation.

Upon loading this flexible magnetic disk on the writing and/or reading apparatus, rotating part 3 (see FIGS. 2–4) of the position-determining part is fitted from under part of the sheet 2, and collet 4 is lowered from upper part of the sheet and is brought into the circular concave part 3a of rotating part 3 as shown in FIG. 2. At this time, the edge of central circular hole 2a does not always correspond to the position of circular concave part 3a of rotating part 3, and is many times out of proper alignment. If collet 4 is lowered in this state, some part of the portion surrounding the edge of circular hole 2a of the sheet 2 may be pinched between collet 4 and concave part 3a of rotating part 3, such that the sheet rotates eccentrically. Writing and reading cannot be carried out correctly unless magnetic disk sheet 2 rotates while being correctly centered corresponding to the central rotating axis, such eccentric pinching should very desirably be prevented. Moreover, there exists another problem, viz., that rattling occurs during rotation due to the absence of planarity of the sheet 2 when it is supported and rotated under such an eccentric pinched state.

Upon connecting the sheet 2 by lowering the collet 4, it is necessary that the portion surrounding the edge of the central circular hole of the sheet possesses an appropriate hardness, and that the friction coefficient ($\mu$) between the sheet 2 and collet 4 as well as between the sheet 2 and rotating part 3 is small, in order that the sheet 2 is loaded correctly as shown in FIG. 4, not as shown in FIG. 3.

For this purpose, a method for reducing the friction coefficient by forming a protecting layer containing a polyolefin material polymerizable with ultraviolet light and an ester of an aliphatic acid on a surface portion surrounding the edge of the central hole of a flexible magnetic sheet where a sheet-position-determining part contacts the sheet is disclosed in U.S. Pat. No. 4,387,114. However, when a low molecular weight aliphatic acid ester lubricant is used as a lubricant, the friction coefficient increases under conditions of high temperature and high humidity, for example, at 40° to 50° C. and at 70 to 80% RH (relative humidity), thereby reducing the effect of preventing the center of the sheet being misaligned with the center of the rotary portion. Also, loading and unloading of the sheet in the reading and/or writing apparatus diminishes the lubricating effect. This may be caused by the lubricating agent being wiped away from the surface portion surrounding the edge of the central hole of a flexible magnetic sheet during loading and unloading of the disc sheet in the apparatus.

SUMMARY OF THE INVENTION

An object of the present invention is to provide a flexible magnetic disc sheet (1) without lose of the beneficial effects of a lubricating agent at high temperature and high humidity and (2) capable of withstanding repeated loading and unloading the disc sheet while maintaining a low friction coefficient between the flexible magnetic disc sheet and the position-determining part without misalignment with the position-determining part.

The inventors of the present invention have extensively investigated concerning the provision of protective layers, especially those containing a compound polymerizable and curable by exposure to radiation and a lubricating agent, and have found that a very excellent effect can be obtained by a certain combination using a certain type of compound curable by exposure to radiation and a solid lubricating agent.

Thus, the objects of the present invention can be attained by a flexible magnetic disk sheet including a central circular hole therein, and having a protective layer on a surface portion surrounding the edge of the central circular hole of the flexible magnetic disk sheet, the protective layer being prepared by coating (a) a compound having an acrylate or a methacrylate bond at the end of at least one of a main chain and a side chain of molecules thereof and (b) a solid lubricating agent, followed by exposing the coated layer to radiation for polymerizing and hardening.

BRIEF DESCRIPTION OF THE DRAWINGS

In FIGS. 1A through 6, 1 is a jacket, 1a is an open hole in the jacket, 2 is a magnetic sheet, 2a is a central circular hole, 3 is a position-determining part (ratating part), 3a is a circular concave part, 4 is a postion-determining part (collet), 10 is a magnetic sheet, 10a is the edge of the central circular hole, 10b and 10b' are surface portions surrounding the edge of the central circular hole, 11 is a protecting layer, and 12 is a slight clearance between the edges of the protecting layers and the edge of the central circular hole.

DETAILED DESCRIPTION OF THE INVENTION

Figure 1A:
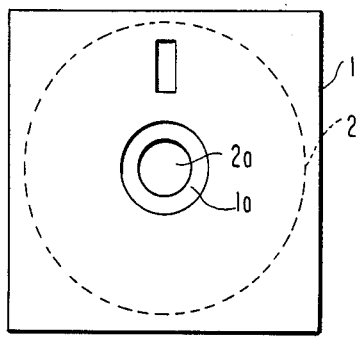
FIG. 1A is planar view showing an example of a flexible magnetic disk according to the invention.
Figure 1B:
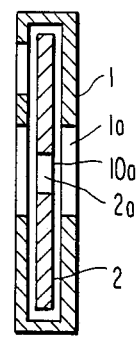
FIG. 1B is its cross-section.
Figure 2:
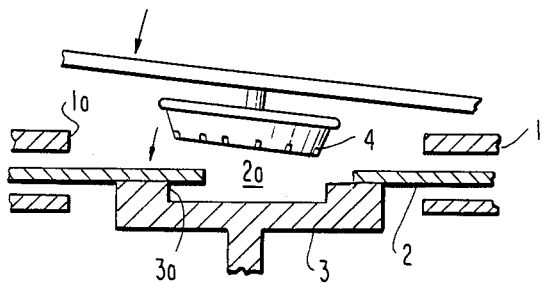
FIG. 2 is a partial cross-sectional view showing the loading of a flexible magnetic disk on a position-determining part of the apparatus.
Figure 3:
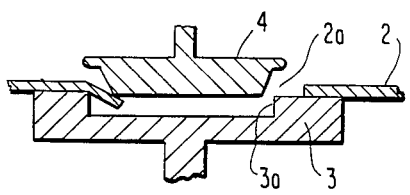
FIG. 3 is a partial cross-sectional view showing a case of loading wherein the sheet is supported eccentrically.
Figure 4:
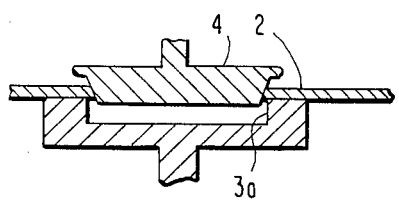
FIG. 4 is a partial cross-sectional view showing a case of loading wherein the sheet is correctly position-determined.

The compound (a) is a compound having an acrylate bond or a methacrylate bond at the end of at least one of a main chain and a side chain of the molecule, and the number of such bonds is generally from 1 to 10, preferably from 1 to 6, and more preferably from 2 to 4, per 1000 units of molecular weight. The molecular weight is not particularly limited, but is preferably from 500 to 30,000, and more preferably from 1,000 to 20,000, of an oligomer or a polymer. The skeleton of the main chain is preferably a polyester skeleton, a polyurethane skeleton, a polyether skeleton, a polycarbonate skeleton, an epoxy resin skeleton, or a mixed skeleton thereof. Of these, a polyester skeleton and a polyurethane skeleton are more preferred, and a polyurethane skeleton is most preferred. Two or more compounds having different skeletons can be used in combination.

The radiation used according to this invention includes a low energy radiation ray such as ultraviolet rays, and high energy radiation such as $\alpha$-rays, X-rays, and electron beams. Among them, ultraviolet rays are preferred, because an apparatus for generating ultraviolet rays is simpler.

When ultraviolet rays are used as the radiation it is preferred that an aromatic ketone which is a photopolymerization initiator is included. Such aromatic ketones are not particularly limited. Preferred aromatic ketones have a relatively large extinction coefficient at the wavelengths of 254, 313, and 365 nm, at which a mercury lamp commonly used as a source of ultraviolet rays generates bright line spectrum. Typical examples are aromatic ketones such as acetophenone, benzophenone, benzoin ethyl ether, benzyl dimethyl ketal, benzyl diethyl ketal, benzoin isobutyl ketone, hydroxydimethyl phenyl ketone, 1-hydroxycyclohexyl phenyl ketone, 2,2-diethoxy acetophenone, and Michler's ketone, with benzoin ethyl ether and benzyl dimethyl ketal being preferred.

The content of aromatic ketone is generally from 0.5 to 20 parts by weight, preferably from 2 to 15 parts by weight, and more preferably from 3 to 10 parts by weight, per 100 parts by weight of the compound (a).

The solid lubricating agents (b) in the present invention are preferably graphite, molybdenum disulfide, tungsten disulfide, boron nitride, graphite fluoride, metal oxides (e.g., a lead monooxide, molybdenum trioxide, silicon dioxide, and the like), silicon nitride, plastic having a molecular weight of from $10^4$ and $10^6$, preferably from $10^4$ to $5 \times 10^5$ (e.g., polytetrafluoroethylene, polyamides such as nylon 6 and nylon 66, polyacetal, polyethylene, polyimide, and the like), and a metal (e.g., lead, copper, zinc, and the like). Of these, molybdenum disulfide, tungsten disulfide and graphite fluoride are preferred, and molybdenum disulfide is more preferred. The solid lubricating agents generally have an average particle size of from 0.1 to 10$\mu$, preferably from 0.2 to 5$\mu$ and more preferably from 0.3 to 4$\mu$. These solid lubricating agents and their properties are described in detail in *Solid Lubricant Hand-Book*, published by Saiwai Shobo in 1978.

The content of the compound (b) is from 1 to 50 parts by weight, and preferably from 5 to 10 parts by weight, per 100 parts by weight of compound (a).

Various organic solvents can be used, if necessary, to facilitate the mixing the compounds (a) and (b) to prepare a coating composition.

The coating composition containing the aforementioned compounds (a) and (b) can be coated on the surface portion surrounding the edge of the central circular hole of the flexible magnetic disk sheet in a conventional manner. The coating thickness after hardening by causing polymerization with exposure to radiation generally ranges from 1 to 50$\mu$, preferably from 5 to 30$\mu$, and more preferably from 10 to 20$\mu$. When the thickness is larger than the above range, it is not favorable owing to the possibility of track-gap. When it is smaller than that range, no sufficient effect results.

The width of the protecting layer may be varied appropriately depending on the size of the disk sheet. For instance, in the case of a 5.25 inch diameter disk sheet, the width of the protecting layer generally is from 2 to 5 mm, preferably is from 2.5 to 3.5 mm, and more preferably is from 2.75 to 3.25 mm. Also preferably, a slight clearance is provided between the edge of the protecting layer and the edge of the central circular hole; this clearance is generally from 15 to 500$\mu$, preferably from 30 to 350$\mu$, and more preferably from 50 to 200$\mu$.

The present invention is further illustrated by the non-limiting examples described below.

Figure 5:
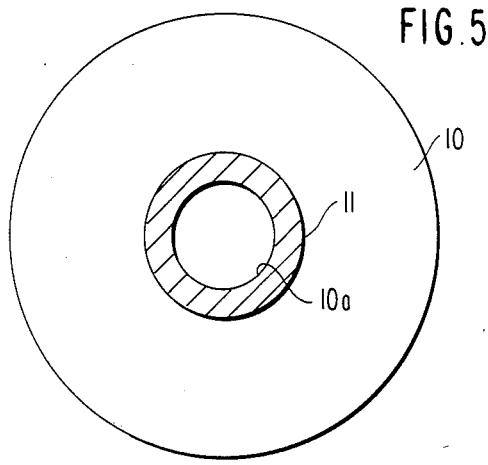
FIG. 5 is planar view showing a sheet part of an example of the invention.
Figure 6:
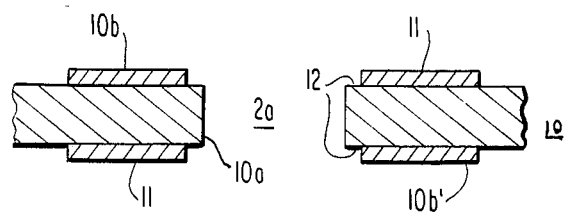
FIG. 6 is a cross-sectional view showing in more detail (not to scale) a preferred sheet part according to the invention, wherein protecting layers are formed on both the upper and lower surface portions surrounding the edge of the central circular hole, with a slight clearance on the surface portions between the edges of the protecting layers and the edge of the central circular portion.

FIGS. 5 and 6 illustrate an example of the present invention. Along the surface portions 10b and 10b' surrounding the edge of central circular hole 10a of flexible magnetic disk sheet 10, a protecting layer 11 of the present invention was applied on both sides of the sheet with a clearance 12 of about 100$\mu$ between the edges of the protecting layers and the edge of the central circular hole. The width of the protecting layer was 3 mm. The following shows the compositions of the Examples according to this invention and of the Comparative Example.

EXAMPLE 1

| | |
|---|---|
| Polyurethane acrylate, (trade name "M-1100" manufactured by Toa Gosei Chemical Industry Co., Ltd. | 100 parts |
| MoS$_2$ (trade mark "Molysulfide" manufactured by Climax Molybden Co., Ltd.; average particle size in diameter 0.3$\mu$) | 10 parts |
| Benzoin ethyl ether | 5 parts |

EXAMPLE 2

| | |
|---|---|
| Polyurethane acrylate (trade name "M-1100" manufactured by Toa Gosei Chemical Industry Co., Ltd. | 100 parts |
| WS$_2$ (average particle size in diameter: 2$\mu$) | 10 parts |

| -continued | |
|---|---|
| Benzoin ethyl ether | 5 parts |

TABLE

| | 25° C., 80% RH | | | 40° C., 80% RH | | |
|---|---|---|---|---|---|---|
| | Friction coefficient ($\mu$) of disc sheet | | Loading test of disc sheet | Friction coefficient ($\mu$) of disc sheet | | Loading test of disc sheet |
| | With collet | With rotating part | with rotating part | With collet | With rotating part | with rotating part |
| Example 1 | 0.35 | 0.24 | A | 0.33 | 0.28 | A |
| Example 2 | 0.38 | 0.31 | A | 0.39 | 0.32 | A |
| Example 3 | 0.39 | 0.30 | A | 0.37 | 0.33 | A |
| Comparative Example 1 | 0.36 | 0.25 | A | 0.47 | 0.37 | B |
| Comparative Example 2 | 0.55 | 0.43 | B | 0.65 | 0.53 | B |

EXAMPLE 3

| Polyurethane acrylate (trade name "M-1100" manufactured by Toa Gosei Chemical Industry Co., Ltd.) | 100 parts |
|---|---|
| Graphite fluoride (average particle size in diameter: 0.5$\mu$) | 10 parts |
| Benzoin ethyl ether | 5 parts |

COMPARATIVE EXAMPLE 1

| Polyurethane acrylate (trade name "M-1100" manufactured by Toa Gosei Chemical Industry Co., Ltd.) | 100 parts |
|---|---|
| Butyl stearate | 5 parts |
| Benzyl dimethyl ketal | 5 parts |

COMPARATIVE EXAMPLE 2

A protective layer was not provided.

Coating solutions consisting of the above-mentioned compositions were prepared and applied to the surface portion surrounding the edge of the central circular hole of the flexible magnetic disk sheet so that the amount coated was about 15 g/m$^2$, i.e., coating thickness is to be 13$\mu$. Then, the coated layer was polymerized and hardened by exposing to ultraviolet ray using a high pressure mercury lamp of 80 W/cm.

The friction coefficient with upper and lower position determining parts in the afore-mentioned Examples and Comparative Examples was measured, and loading test on disk drive was conducted under the conditions of 25° C., 80% RH, and 40° C., 80% RH.

The results are shown in the Table below.

Measurement of the friction coefficient ($\mu$ value) was conducted by rubbing the magnetic sheet with position-determining part (collet) at a rate of 0.8 mm/sec under additional weight of a 70 g weight using a strain gauge "UT-IK" made by NMB Co. The friction coefficient with position-determining part (rotating part) was measured similarly.

The drives used for loading tests on disk drives were YD-280 and 380 made by Y-E Data Co.; JA 751 and 561 made by Matsushita Tsuko Co.); and M-2894 and 4853 made by Mitsubishi Electric Co.

The results are shown by an A for cases in which the disk was correctly loaded on all drives, and by a B for cases in which the disk was uncorrectly loaded on more than one drive upon repeated loadings, i.e., ten times on each drive.

The magnetic disc sheet of Comparative Example 1, having the same composition as that of the present invention except that a conventionally used lubricating agent was used exhibited a higher friction coefficient in every case and the result of the loading test of the disc sheet with a rotating part was worse under conditions of high temperature and high humidity. Comparative Example 2, where no protective layer was provided, exhibited the worst results regarding the friction coefficient and the loading test. In is clear from the Examples and Comparative Examples that the protective layer of the present invention provides a low friction coefficient even under high temperature and high humidity conditions, and exhibits excellent result of loading test.

While the invention has been described in detail and with reference to specific embodiment thereof, it will be apparent to one skilled in the art that various changes and modifications can be made therein without departing from the spirit and scope thereof.

What is claimed is:

1. A flexible magnetic disc sheet having a central circular hole therein and having a protective layer only on a surface portion surrounding the edge of the central circular hole, said protective layer being prepared by coating (a) a compound having an acrylate bond or a methacrylate bond at the end of at least one of a main chain and a side chain of molecules thereof, and (b) a solid lubricating agent, and exposing the coated layer to radiation for polymerizing and hardening, wherein the thickness of the coated layer after polymerization and hardening is from 1 to 50 $\mu$m.

2. A flexible magnetic disc sheet as in claim 1, wherein the compound (a) has from 1 to 10 acrylate or methacrylate bonds per 1000 units of molecular weight.

3. A flexible magnetic disc sheet as in claim 2, wherein the compound (a) has from 1 to 6 acrylate or methacrylate bonds per 1000 units of molecular weight.

4. A flexible magnetic disc sheet as in claim 3, wherein the compound (a) has from 2 to 4 acrylate or methacrylate bonds per 1000 units of molecular weight.

5. A flexible magnetic disc sheet as in claim 1, wherein the rays for polymerizing and hardening are ultraviolet rays.

6. A flexible magnetic disc sheet as in claim 1, wherein the solid lubricating agent (b) is selected from the group consisting of graphite, molybdenum disulfide, tungsten disulfide, boron nitride, graphite fluoride, metal oxides, silicon nitride, plastic, and metal.

7. A flexible magnetic disc sheet as in claim 6, wherein the solid lubricating agent (b) is selected from the group consisting of graphite, molybdenum disulfide, tungsten disulfide, boron nitride, graphite fluoride, lead monooxide, molybdenum trioxide, silicon dioxide, silicon nitride, polytetrafluoroethylene, polyamides, polyacetal, polyethylene, polyimides, lead, copper and zinc.

8. A flexible magnetic disc sheet as in claim 7, wherein the solid lubricating agent (b) is selected from the group consisting of molybdenum disulfide, tungsten disulfide, and graphite fluoride.

9. A flexible magnetic disc sheet as in claim 1, wherein the content of the compound (b) is from 1 to 50 parts by weight per 100 parts by weight of compound (a).

10. A flexible magnetic disk sheet as in claim 9, wherein the content of the compound (b) is from 5 to 10 parts by weight per 100 parts by weight of compound (a).

11. A flexible magnetic disc sheet as in claim 1, wherein the thickness of the coated layer after polymerization and hardening is from 5 to 30 μm.

12. A flexible magnetic disc sheet as in claim 11, wherein the thickness of the coated layer after polymerization and hardening is from 10 to 20 μm.

* * * * *